United States Patent [19]

Sakamoto et al.

[11] Patent Number: 5,027,502
[45] Date of Patent: Jul. 2, 1991

[54] AUTOMOBILE ASSEMBLING METHOD AND APPARATUS THEREFOR

[75] Inventors: Shunji Sakamoto, Higashihiroshima; Hisaaki Katsuki, Hiroshima; Junichi Usui, Shiga; Haruo Oda, Sakai, all of Japan

[73] Assignees: Mazda Motor Corporation, Hiroshima; Daifuku Co., Ltd., Osaka, both of Japan

[21] Appl. No.: 539,307

[22] Filed: Jun. 18, 1990

Related U.S. Application Data

[63] Continuation of Ser. No. 277,820, Nov. 30, 1988, abandoned.

[30] Foreign Application Priority Data

Dec. 1, 1987 [JP] Japan .................. 62-305222

[51] Int. Cl.⁵ ............................. B23P 21/00
[52] U.S. Cl. ............................. 29/783; 29/784; 29/791; 29/799
[58] Field of Search ............ 29/429, 430, 469, 701, 29/702, 703, 711, 712, 771, 783, 784, 785, 786, 787, 791, 793, 794, 795, 799, 823, 824; 198/465.1, 465.2, 465.3, 803.01, 803.2

[56] References Cited

U.S. PATENT DOCUMENTS

| | | | |
|---|---|---|---|
| 3,968,559 | 7/1976 | Karlsson | 29/430 |
| 4,575,934 | 3/1986 | Kitamura et al. | 29/787 |
| 4,734,979 | 4/1988 | Sakamoto et al. | 29/822 |
| 4,805,286 | 2/1989 | Uchida et al. | 29/469 X |
| 4,827,598 | 5/1989 | Sakamoto et al. | 29/430 |

FOREIGN PATENT DOCUMENTS

| | | | |
|---|---|---|---|
| 56-103665 | 8/1981 | Japan . | |
| 58-15252 | 3/1983 | Japan . | |
| 62-210184 | 9/1987 | Japan | 29/469 |

Primary Examiner—Joseph M. Gorski
Attorney, Agent, or Firm—Fleit, Jacobson, Cohn, Price, Holman & Stern

[57] ABSTRACT

An automobile assembling apparatus is provided to provisionally assemble a set of front and rear drive system assemblies, each having at least a suspension system with a damper unit dangling thereon, to a vehicle body prior to rigidly securing, and thereby setting up, the front and rear drive system assemblies and vehicle body into one unit with fasteners in an automobile assembling line and comprises a carrier pallet for carrying the set of front and rear drive system assemblies placed thereon in position, a conveyor for conveying the front and rear drive system assemblies on the carrier pallet to a provisional assembling station wherre front and rear drive system assemblies are provisionally assembled to vehicle bodies, an overhead conveyor for conveying the vehicle body above the provisional assembling station and lowering it on the front and rear drive system assemblies to provisionally assemble the front and rear drive system assemblies to the vehicle body, and a holding device installed at the provisional assembling station for releasably holding the suspension damper unit of at least one of said front and rear drive system assemblies still in a setting position relative to the vehicle body.

13 Claims, 8 Drawing Sheets

AUTOMOBILE ASSEMBLING METHOD AND APPARATUS THEREFOR

This application is a continuation, of application Ser. No. 07/277,820, filed Nov. 30, 1988 and now abandoned.

BACKGROUND OF THE INVENTION

The present invention relates generally to a method and apparatus for assembling automobiles, and more particularly to a method and apparatus for assembling a sub-assembly on a main assembly such as a vehicle body.

Conventionally, in an automobile assembling line, for example in an assembling line where sub-assemblies including at least a drive axle setup and suspension units are mounted on a vehicle body, a conveyor system conveys the sub-assemblies placed on carrier means, such as a carrier pallet, to a provisional assembling station in the assembling line where each of the sub-assemblies are provisionally assembled with a vehicle body into one unit. Thereafter, either at the provisional assembling station or a fastening or securing station generally located after the provisional assembling station in the assembling line, the whole unit thus provisionally assembled on the carrier means is secured with fasteners such as bolts and nuts.

Meanwhile, one of various types of suspension systems, for example, the strut type of suspension systems, having a shock absorber or damper unit which dangles from a suspension system is provisionally assembled to the vehicle body. For properly provisionally assembling such a sub-assembly including a suspension system with a dangling damper unit to a vehicle body, it is required to bring and hold the damper unit at a proper setting posture or attitude relative to the vehicle body. It may be useful for the fulfillment of such a requirement to provide a carrier means itself with means for holding the damper unit of the suspension system placed on the carrier means.

It will, however, become a primary cause of an increased investment in the assembling line, with an increase in associated equipment, to provide holding means on each carrier means, because a large number of carrier means are generally used to provide a constant stream of automobile assemblies in the assembling line. Moreover, the holding means provided on each carrier means will interfere with the progress of further assembling works, such as, securing the assembly thus provisionally assembled with fasteners using a manipulator or industrial robot hand and attaching, and then securing, tires to the assemblies on the carrier means before or after the provisionally assembling of the sub-assemblies to the vehicle body. In such circumstances, carrier means with holding means provided thereon are of less practical application in the automobile assembling line.

OBJECT OF THE INVENTION

It is, therefore, an object of the present invention to provide a method and apparatus for provisionally assembling a front drive system assembly with a damper unit dangling thereon to a vehicle body, which apparatus has no need of an increased investment in an automobile assembling line or for extra associated equipment.

It is another object of the present invention to provide a method and apparatus for provisionally assembling a front drive system assembly including a suspension system with a damper unit dangling thereon to a vehicle body, which apparatus does not interfere with other associated assembling works in an automobile assembling line.

SUMMARY OF THE INVENTION

According to the present invention, a method and apparatus are provided an apparatus in an automobile assembling line for provisionally assembling front and rear drive system assemblies each of which includes at least a suspension system with a damper unit dangling thereon, to a vehicle body in proper registry prior to rigidly securing, and thereby completely assembling the front and rear drive system assemblies and the vehicle body into one unit in the automobile assembling line. The provisional assembling apparatus of the present invention comprises carrier means for bearing or carrying a set of front and rear drive system assemblies placed thereon in position, conveyor means for conveying the front and rear drive system assemblies on the carrier means to a provisional assembling station where the front and rear drive system assemblies are provisionally assembled to a vehicle body, overhead conveyor means for conveying the vehicle body above the provisional assembling station and then lifting it down to provisionally assemble the front and rear drive system assemblies to the vehicle body, and holding means located at the provisional assembling station for releasably holding the suspension damper unit of at least one of the front and rear drive system assemblies still in a predetermined posture or attitude relative to the vehicle body.

An important advantage of the present invention resides in the provision of holding means installed at the provisional assembling station in the automobile assembling line where the front and rear drive system assemblies placed on the carrier means are provisionally assembled to the vehicle body in proper registry prior to rigidly securing, and thereby setting up, the front and rear drive system assemblies and the vehicle body into one unit with fasteners. The holding means is adapted to releasably hold at least one of the suspension damper units dangling on the front and rear drive system assemblies still in a predetermined setting posture or attitude relative to the vehicle body.

In a specific embodiment of the present invention the holding means installed at the provisional assembling station has a holding head comprising a fixed finger formed with a V-shaped recess open inside and a pair of swingable fingers which open and close to press, and thereby to hold, the suspension damper unit against the V-shaped recess.

In the provisional assembling apparatus, thus constructed in accordance with the present invention, the holding means installed at the provisional assembling position in the assembling line can releasably hold the suspension damper units of the rear and/or front drive unit system assemblies placed on the carrier means, such as carrier pallets, conveyed to the provisional assembling station one after another. The installation of the holding means can realize a decreased investment in the automobile assembling line, with a decrease in associated equipment, in comparison with conventional automobile assembling lines which use a number of carrier means, each provided with its own holding means. Furthermore, the installation of the holding means does not interfere with any assembling works taken before and- /or after the provisional assembling of front and rear drive system assemblies to a vehicle body.

BRIEF DESCRIPTION OF THE DRAWINGS

The above, and other objects, features and advantages of the present invention will become apparent from the following detailed description which is to be read in conjunction with the accompanying drawings in which.

DETAILED DESCRIPTION OF THE INVENTION

Figure 1:
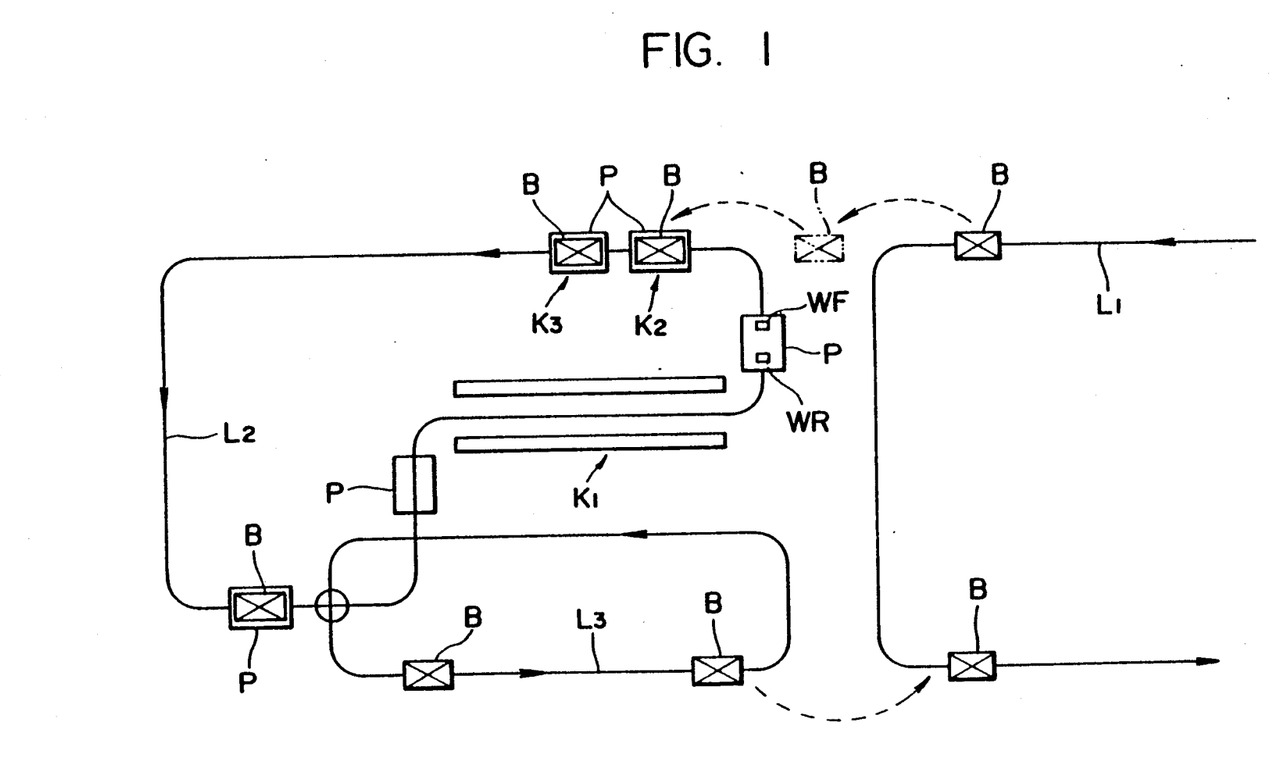
FIG. 1 is a schematic illustration showing an automobile assembling line in which the present invention is embodied.

Before describing the method and apparatus of the present invention in detail, reference is made to FIG. 1 for the purpose of providing a brief description of a vehicle assembling line that will enhance an understanding of operation of the assembling method and apparatus of the present invention. It is to be noted that throughout the specification the term "front drive system assembly" is used to mean and refer to an assembly including at least an engine, a front drive axle setup and a front suspension system with its shock absorber or damper units dangling thereon, and their associated parts, and the term "rear drive system assembly" is used to mean and refer to an assembly including at least a rear drive axle setup and a rear suspension system with its shock absorber or damper units, and their associated parts.

As shown in FIG. 1, the vehicle assembling line comprises a main assembling line L1 including an overhead conveyor system, a sub-assembling line L2 including a roller conveyor system and a transfer line L3 including an overhead conveyor system. A vehicle body B is transferred from the main assembling line L1 to the sub-assembling line L2. In the sub-assembling line L2, the vehicle body B is attached with various parts and part assemblies, such as, an engine, rear and front suspension and drive axle assemblies, seat assemblies, wheels, an exhaust system, etc, and then transferred back to the main assembling line L1 through the transfer line L3. In the main assembling line L1, the vehicle body B is subjected to further assembling works to assemble further necessary parts and part assemblies.

The sub-assembling line L2 has a roller conveyor system for conveying a plurality of carrier pallets P through various working stations including at least a loading station K1, a provisional assembling station K2 and a fastening station K3. Each carrier pallet P bears or carries a set of front and rear drive system assemblies WF and WR placed thereon in preselected positions. These front and rear drive system assemblies WF and WR are loaded onto the carrier pallet P at the loading station K1 and are then provisionally assembled to a vehicle body B at the provisional assembling position K2. Thereafter, at the fastening station K3, the front and rear drive system assemblies WF and WR and the vehicle body B are secured to each other with bolts and nuts. The carrier pallet P is then further transferred through various working stations in the sub-assembling line L2 in order, for example, to mount seat assemblies, wheels, an exhaust system, etc. on the vehicle body B in a well known manner. The vehicle body B with the front and rear drive system assemblies, and other parts and/or assemblies described above is unloaded from the carrier pallet P and transferred to the main assembling line L1 by the overhead conveyor of the transfer line L3.

Referring now to FIGS. 2 to 5, an assembling apparatus of the present invention is shown installed at the provisional assembling station K2 in the sub-assembling line L2. The carrier pallet P is carried on the roller conveyor system. The pallet P is shown in detail in FIGS. 4 and 5, and consists of a pallet frame made from a pair of lengthwise side frame members 1 and eight cross beams 2. Pallet P is provided with front and rear supports HF and HR for receiving and supporting the front and rear drive system assemblies WF and WR, respectively, on the pallet P. The front and rear supports HF and HR are fixed to, and thereby carried on, pairs of cross beams 2, respectively. For positioning the carrier pallet P relative to the sub-assembling line L2 at the provisional assembling station K2 or the fastening station K3, the carrier pallet P is formed with positioning holes 3 defined in horizontally projecting flanges fixed to the front and rear cross beams 2. Lock pins 4 (see FIGS. 5 and 7) are mounted for vertical reciprocation at the provisional assembling station K2 and the fastening station K3 and actuated by, for example, air cylinders not shown but well known in the art, to be received in the holes 3 and hold the pallet P in a preselected fixed position. In association with support HF, there are nut holders 5a and bolt holders 5b adapted to hold nuts and bolts, respectively, to lift up and down, and to turn in any desired direction about an vertical axis of rotation so as to locate the nuts and bolts for cooperation and coaction with bolts and nuts of the front drive system assembly WF and the vehicle body. However, in association with support HF, there are only bolt holders 5b adapted to hold bolts to lift up and down, and to turn in any desired direction about an vertical axis of rotation so as to locate the bolts for cooperation and coaction with nuts of the rear drive system assembly WR and the vehicle body. These nuts and bolts thus handled by the nut and bolts holders 5a and 5b are fastened and coupled to corresponding bolts and nuts to thereby securely to couple the front and rear drive system assemblies WF and WR and the the vehicle body B together, at the fastening station K3.

To carry out such a fastening work at the fastening station K3, a pair of single purpose manipulators or industrial robot hands R (see FIG. 7) are provided for operating the front and rear holders 5a and 5b. Each robot hand R is connected to and controlled by a robot main body through an articulated arm to operate so as to grasp the holder 5a, 5b at its lower end and to turn and/or lift it up and down as is required.

Figure 3:
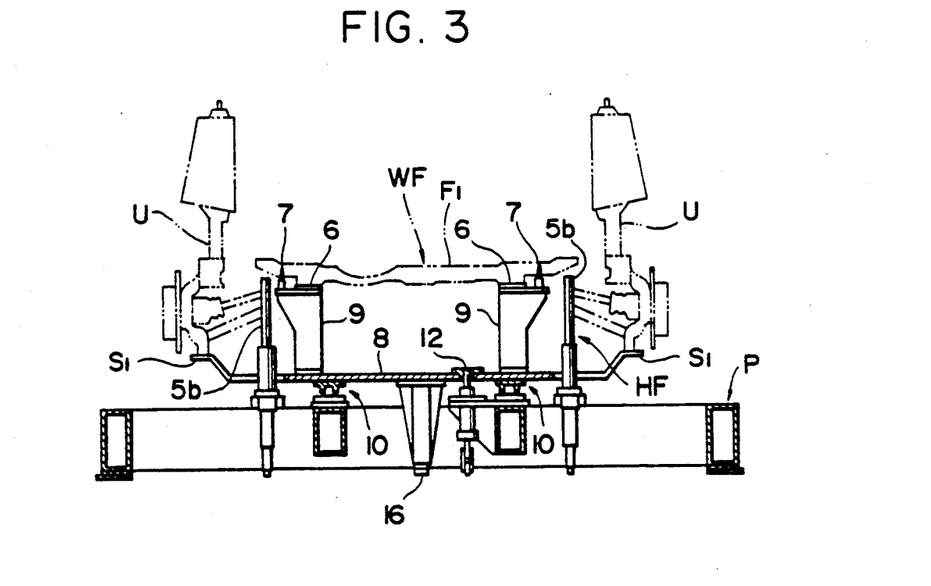
FIG. 3 is a sectional view showing the provisional assembling apparatus similar to FIG. 2, but viewed from the front side thereof in a state that a front drive system assembly is located at the provisional assembling station in the assembling line.
Figure 4:
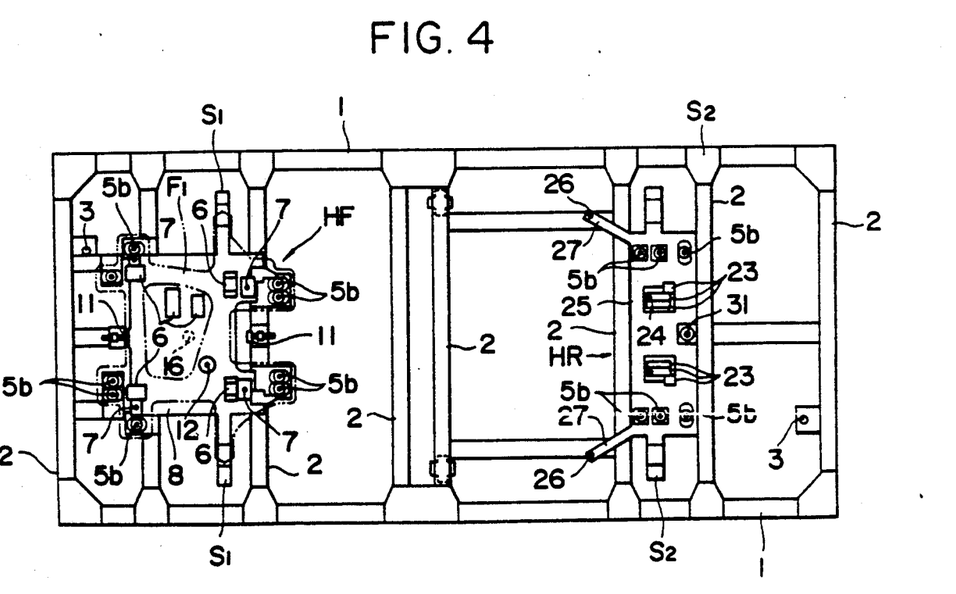
FIG. 4 is a plan view of a carrier pallet.
Figure 5:
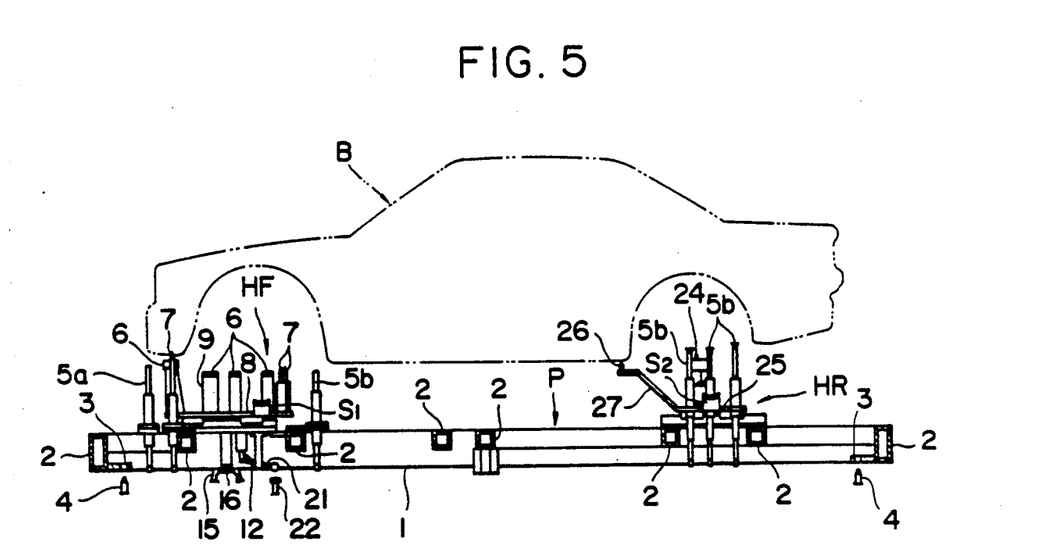
FIG. 5 is a side view of the carrier pallet shown in FIG. 4.

As shown in FIG. 3, the front support HF has a plate-like base member 8 on which are fixed a plurality of supports or columns 9 extending upwardly therefrom. Studs or discs 6 and positioning pins 7 are mounted or fixed on the top end face of some of the supports 9, only studs 6 are fixed on the top end face of some of the supports 9 and only pins 7 are fixed on the top end face of some of the supports 9. The studs 6 are engageable with preselected flat portions of base frame F1 of the front drive system assembly WF to support it, and the positioning pins 7 are engageable with preselected holes in the base frame F1 of the front drive system assembly WF from the bottom to place and locate it in position on the front support HF. The base member 8 is further integrally formed with side projecting gull wings S1 for supporting thereon wheel supporting brackets of a front wheel assembly.

The plate-like base member 8, as is clearly shown in FIG. 3, is slidably supported on pallet P for back and forth movement by a pair of female guide rails fixed onto the bottom of base member 8 cooperating with a pair of male guide rails 10 on the carrier pallet P enabling adjustment of the front support HF lengthwise relative to the front drive system assembly WF. For defining the extremities of lengthwise movement of the front support HF, a pair of stoppers 11 fixed on the carrier pallet P abut against the front and rear edges of the base member 8 to stop the front support HF in preselected forward and rearward positions. In addition, for securing the front support HF at a proper position relative to the front drive system assembly, the carrier pallet P is provided with a lock pin 12 which is forced up by a spring (not shown) to engage against the front base member 8 from underneath. The lock pin 12, on the other hand, is disengaged from the front base member 8 by pushing up one end of a releasing lever 21 by an air cylinder 22 against the spring, releasing the front base member 8. Lever 21 is pivoted to a lug mounted on the pallet P and has its other end pivotally attached to pin 12. It is preferred to effect the securing of the front support HF with the lock pin 12 in cooperation with automatic adjustment of the front support HF as will be described in detail later.

In order to avoid the bumping of the front drive system assembly against the vehicle body upon provisionally assembling them as will be described later, the front support HF is, in this embodiment, adapted to be moved automatically back and forth at the provisional assembling station K2. As is shown in detail in FIG. 6, a pair of guide rails 13 are provided on a frame of the assembling apparatus at the provisional assembling station K2 for supporting a slidable table 14 for back and forth movement. The slidable table 14 has a fixed piece 14a threadingly engaged by a threaded rod or lead screw 18 driven by a reversible motor 17 and is moved back and forth as a result of rotation of the motor 17.

Figure 6:
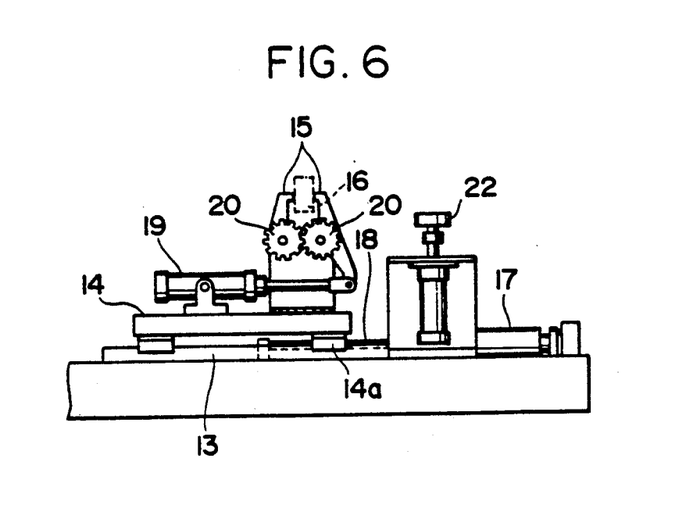
FIG. 6 is a side view of a shifting mechanism.

The sliding table 14 is provided with clamping means comprising a pair of clamping fingers 15 for clamping a lug 16 fixed to and extending downwardly from the front base member 8 of the front support HF. The clamping fingers 15 are integrally provided with gears 20, respectively, which are in mesh with each other. One of the clamping fingers 15 is operationally coupled to an air cylinder 19. As apparent, when the air cylinder 19 is actuated, the clamping fingers 15 are forced to move close to each other, clamping the lug 16 of the base member 8 of the front support HF so as to fix the front support HF in position.

The rear support HR has a plate-like base member 25 provided with a plurality of supports 26 extending upwardly therefrom upon which are mounted studs 23 and positioning pins 24. The studs 23 are engageable with preselected flat portions of a base frame F2 of the rear drive system assembly WR to support it and the positioning pins 24 are engageable with preselected openings in the base frame F2 of the front drive system assembly WR from the bottom to place it in position on the rear support HR. It is to be noted that the studs 23 and the positioning pins 24 are selectively used according to types of vehicles, four-wheel or two-wheel drive and four-wheel or two-wheel steering. For such a selective usage of the studs 23 and the positioning pins 24, the supports 26, 27 are retractable downwards.

It is noted that the holders 5a and 5b are attached to the plate-like rear base member 25 for the rear drive system assembly WR. Holders 5a and 5b are directly attached to the carrier pallet P for the front drive system assembly WF. Some of the holders 5a and 5b attached to the rear base member 25 are vertically adjustable in position by conventional means to the types of vehicles, four-wheel or two-wheel drive and four-wheel or two-wheel steering. The rear base member 25 is further provided with side projecting gull wings or studs S2 for supporting parts of a rear wheel assembly, such as, wheel supporting brackets and brackets of pins which are engageable with the vehicle body B when provisionally assembled from the bottom.

As is well known in the art, the wheel base of a vehicle varies and depends upon the different types or models of the vehicle being assembled. Therefore, in order to make the assembling apparatus of the present invention available for assembly of different types or models of a vehicle to be assembled, which types and models are different in wheel base, the rear support HR is movable back and forth on the carrier pallet P. This is realized by the provision of guides 29 consisting of a pair of longitudinally extending transversely spaced female guide rails 29 attached to the bottom of the rear base member 25 which are operationally engaged with a pair of longitudinally extending transversely spaced male guide rails attached to the pallet P. The two pairs of rails slidably support member 25 for back and forth movement. For positioning the base member 25 at different positions in the lengthwise direction, the carrier plate P has attached thereto a block 30 formed with two holes at two different positions spaced in the lengthwise direction. These two holes are selectively engaged by a stop pin 31 retractably extending downwardly from the base member 25. The stop pin 31 is forced or biased or urged downwards by means of a spring and therefore, normally engages or is received in one of the two holes. When it is desired to change the position of the base member 25, the pin 31 is pulled up against the spring to retract pin 31 from the hole. By selectively engaging the stop pin 31 with the holes of the block 30, the rear support HR is secured at one of two different positions lengthwise spaced apart.

Figure 7:
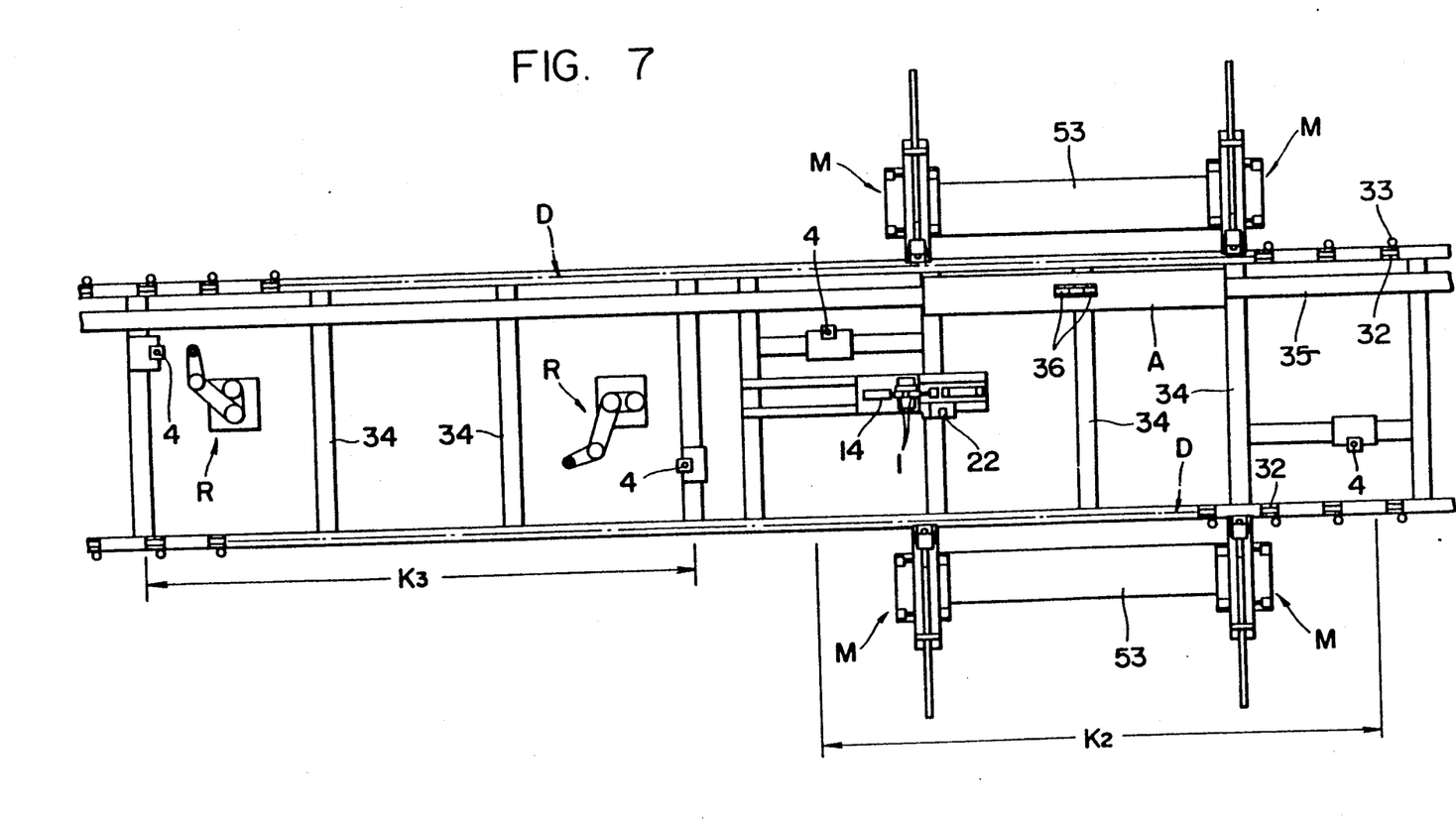
FIG. 7 is a plan view partly in schematic illustrating a provisional assembling and a fastening station of the automobile assembling line.
Figure 8:
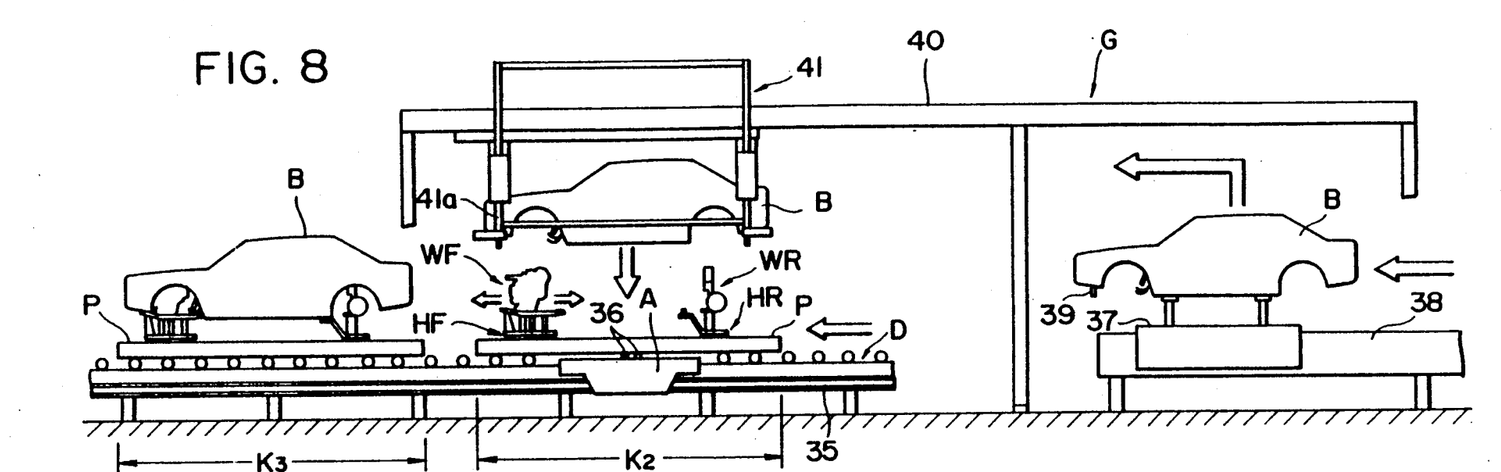
FIG. 8 is a side view partly in schematic illustrating the provisional assembling station of FIG. 7.

Referring now to FIGS. 7 and 8, a pallet transfer means is shown including the roller conveyor system set up in the sub-assembling line L2 and a carriage A for retaining and carrying the carrier pallet P. The roller conveyor system of the sub-assembling line L2 has a pair of tracks or rails D extending in parallel with each other over the sub-assembling line L2 and connected together by transverse U-shaped frame members 34 arranged at appropriate longitudinal spacings or intervals. The U-shaped frame members 34 are attached with various devices and elements (not shown) necessary for the sub-assembling line L2. Each track rail D is formed with a large number of openings distributed at substantially regular spacings or intervals. Supporting rollers 32 are mounted in rail D for rotation about horizontal axes of and each partially projects upwardly out of each opening above the upper plane of rail D. Along each track rail D are distributed a large number of side rollers 33 at substantially regular longitudinal spacings or intervals. Each side roller 33 extends beyond the upper surface of the track rail D and is mounted about a vertical axis for rotation. The carrier pallet P is transferred being supported horizontally on the projecting supporting rollers 32 and being laterally supported by the side rollers 33. All of the supporting and side rollers 32 and 33 rotate following the advancement of pallet P transferred by a carriage A described later.

Figure 2:
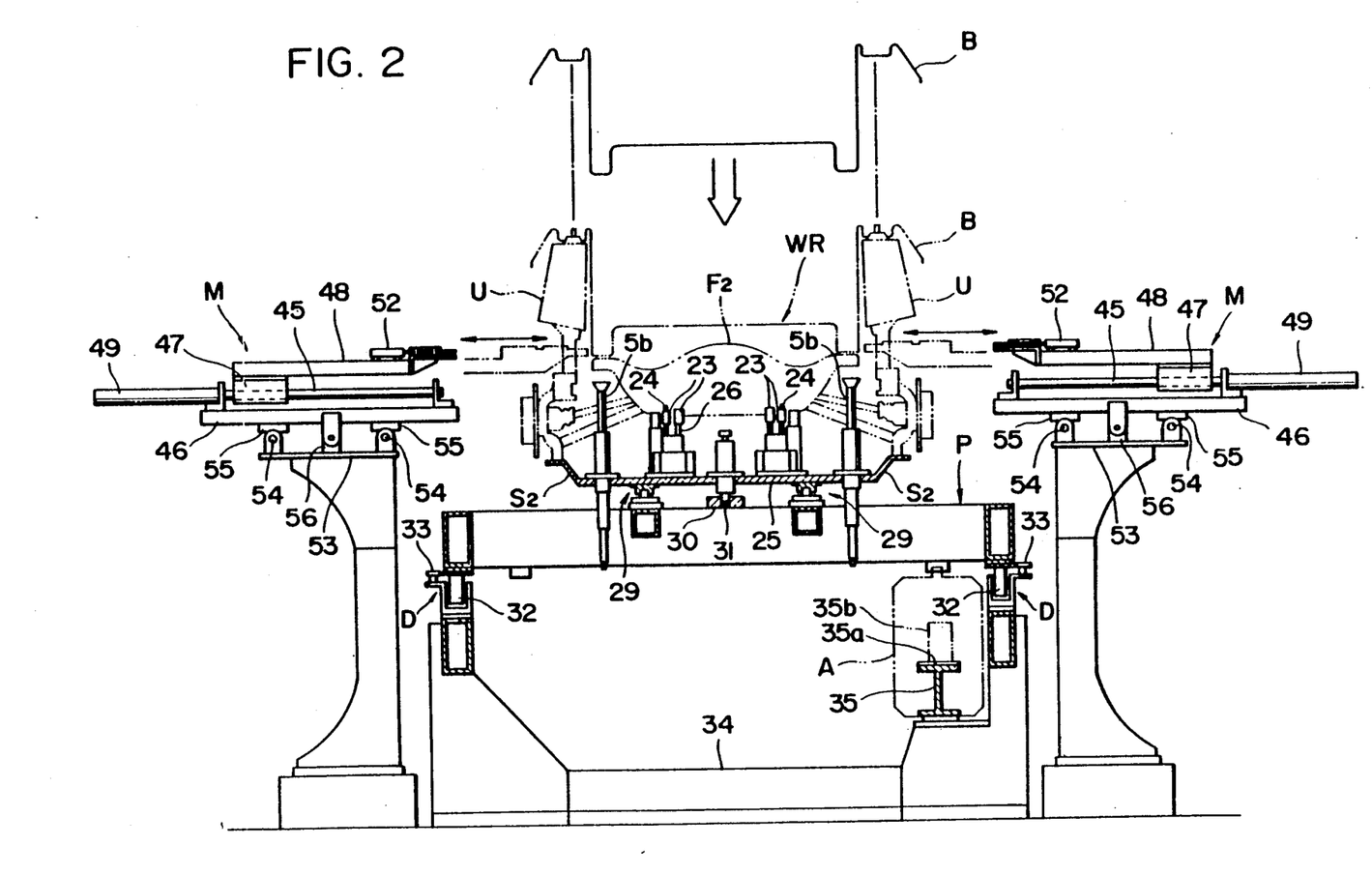
FIG. 2 is a sectional view showing the provisional assembling apparatus according to the present invention viewed from the back side thereof in a state that a rear drive system assembly is located at a provisional assembling station in the assembling line.

The carriage A is, as is seen in FIG. 2, mounted on a longitudinal extending guide rail 35 having an I-shaped cross section for lengthwise movement. The guide rail 35 is provided with a rack 35a attached to its upper surface. To advancing the pallet P, the carriage A is provided with a pinion gear 35b driven by a reversible motor (not shown) incorporated therein and in mesh with the rack 35a attached to the guide rail 35. The carriage A is further provided with a pair of retainers 36 which couple to a carrier pallet P at the provisional assembling station K2 and decouple it at the fastening station K3. The motor in the carriage A is automatically controlled to rotate in a normal direction when the carriage A moves forwardly the pallet P through the rack-and-pinion 35a-35b engagement from the provisional assembling station K2 to the fastening station K3 but in the reverse direction when the carriage A moves backwardly leaving the carriage pallet P at the fastening station K3 toward the provisional assembling station K2. This is effected in a conventional manner well known in the art.

Figure 9:
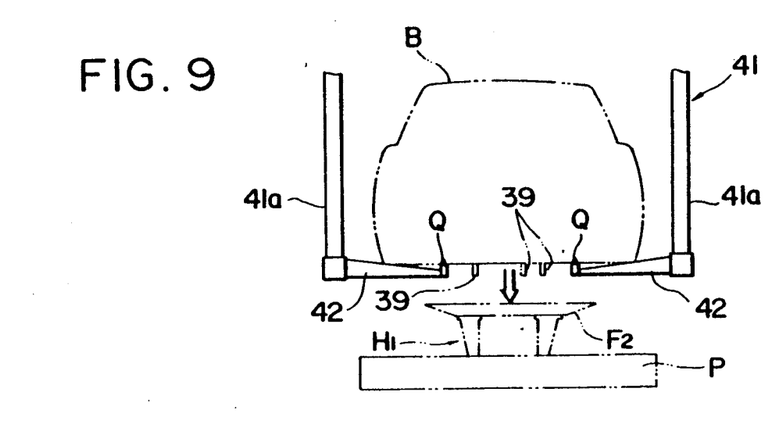
FIG. 9 is a front view illustrating an overhead carrier.

A vehicle body B transferred by the belt conveyor of the main assembling line L1 is lifted up and forwarded to the sub-assembling line L2, in particular, to a position overhead the provisional assembling station K2, by body carrier conveyor G as is shown in FIGS. 8 and 9. At the provisional assembling station K2, the vehicle body B is lowered so as to be provisionally assembled to the front and rear drive system assemblies WF and WR on the carrier pallet P having been forwardly transferred to the provisional assembling station K2. For the transfer of the vehicle body B, there is provided between the main and sub-assembling lines L1 and L2 a relay carrier 37. Carrier 37 is movable back and forth on guide rails 38 forming part of the main assembling line L1. The vehicle body B is transferred onto carrier 37 and is carried to a position where the body carrier conveyor G is ready to receive it as shown to the right in FIG. 8.

The body carrier conveyor G has an overhead carrier 41 slidably hung from a guide rail 40. The overhead carrier 41 supports a hanger frame 41a that moves up and down. The hanger frame 41a has cantilever front and rear hanger arms 42 provided at their lower free ends. Pins Q are fixed on the free ends of hanger arms 42 and are engageable with the vehicle body hung thereby. Each hanger arm 42 is pivotally supported by hanger frame 41a for rotation about a vertical axis. Hanger arms 42 are rotated by an air cylinder (not shown) to turn in a horizontal plane.

Figure 10:
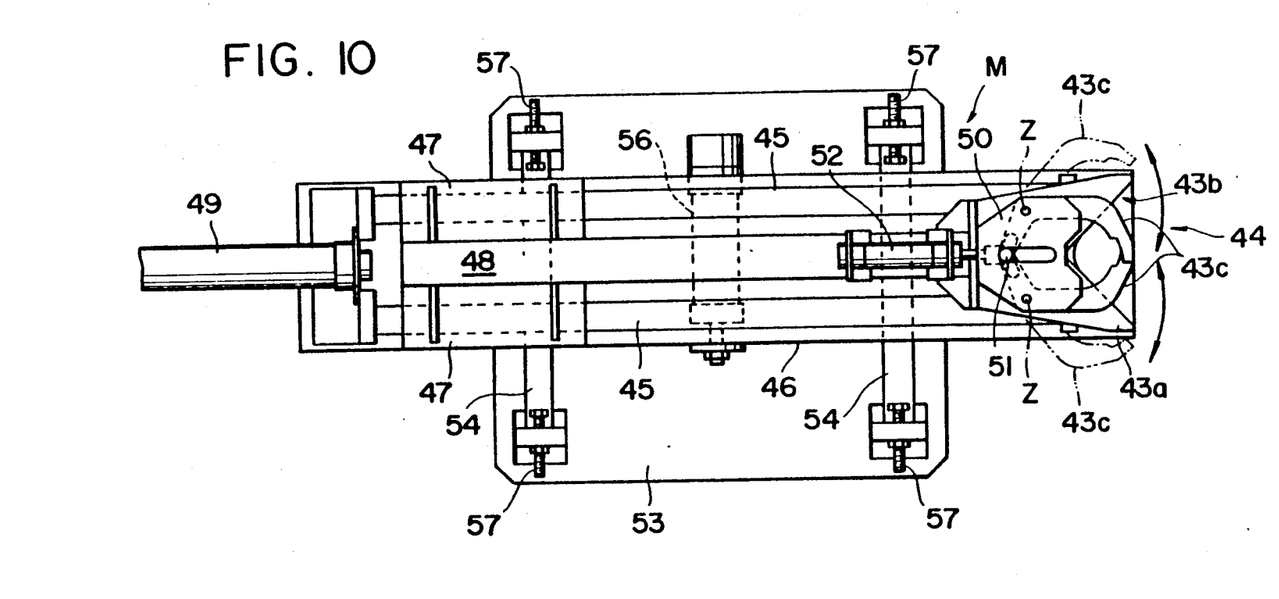
FIG. 10 is a plan view showing holding means.
Figure 11:
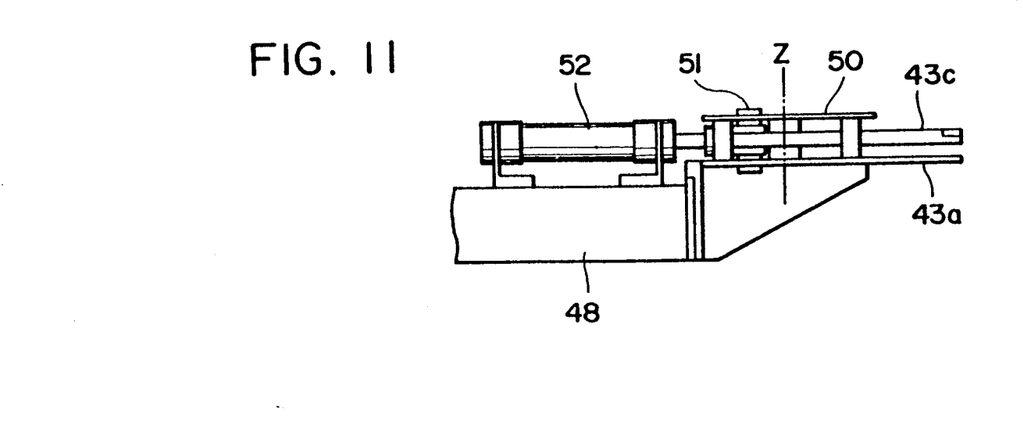
FIG. 11 is a side view showing the holding means of FIG. 10.

As is shown in FIGS. 2, 10 and 11, there are four holding structures M at the provisional assembling station K2 for properly holding suspension damper units U of, for example, the strut type of suspensions of the front and rear drive system assemblies WF and WR. The suspension damper unit U is connected to but dangles on the wheel supporting bracket which is joined to each base frame F1, F2 of each drive system assembly WF, WR through a swingable arm. Each holding structure M, as is shown in greater detail in FIGS. 10 and 11, has a holding hand 44 including a fixed finger 43a with a V-shaped cutout or recess 43b opening toward the damper unit U. A pair of fingers 43c are pivotally mounted and swingable away from and toward each other.

Details of each holding structure M locate on each side of the carrier pallet P at the provisional assembling station K2 is explained with reference to FIG. 10. A slidable block 47 is supported for sliding movement by a pair of guide rods 45 extending in parallel with each other and in a transverse direction relative to the carrier pallet P. Block 47 and rods 45 are mounted on a table 46 supported on a base frame 53. Block 47 is attached with an elongated supporting frame 48 having the fixed finger 43a bolted thereto at its end nearest pallet A. An air cylinder 49 is attached to frame 48 at the opposite end. Cylinder 49 when actuated causes the sliding movement of the slidable block 47. The holding hand 44, as is noted above, includes the swingable fingers 43c, which swingable fingers 43c are pivotally supported by and extend between the fixed finger 43a and a cover plate 50 bolted to the fixed finger 43a through a spacer. Fingers 43 swing about vertical axes of rotation Z. For causing the swingable movement of the swingable fingers 43c, a pin 51 is received in slots formed in the ends of the swingable fingers 43c. Pin 51 rides in a slot in cover plate 50 extending in the transverse direction with respect to the carrier plate P. An air operated cylinder 52 moves the pin 51 in the transverse direction in the slot and the swingable fingers 43c are forced to open and close. With the closing of the swingable fingers 43c, the holding hand 44 brings the suspension damper unit U into the V-shaped recess 43b of the fixed finger 43a and clamps it by the swingable fingers 43c.

The holding structure M is shiftable back and forth relative to a lengthwise direction in which the carrier pallet P is transported. For shifting the holding structure M, a shift mechanism is provided comprising a pair of spaced parallel guide frames 54 arranged in the longitudinal direction of movement of pallet P. The table 46 on which the holding structure M is mounted is supported for sliding movement on the guide frames 54 through trucks or members 55 (see FIG. 2) attached to the under surface of the table 46. Air operated cylinder 56 is mounted on the base 53 and attached to the table 46 to move the table 46 on the guide frames 54. Owing to the provision of the shift mechanism, the holding structure M can be shifted in the lengthwise direction. Stoppers 57 are provided for limiting the movement of the holding structure M therebetween.

The right and left holding structures M for the front drive system assembly WF are shifted back or forth in synchronism with the back or forth movement of the front support HF upon provisionally assembling the front drive system assembly WF to the vehicle body B. Also the right and left holding structures M for the rear drive system assembly WF are shifted back or forth in synchronism with the back or forth movement of the rear support HR upon adjusting the rear support HR to the wheel base of vehicle.

Reference is now had to the drawings, in particular to FIGS. 8 and 12(A) to 12(C) for describing the provisional assembling of the vehicle body B and the front and rear drive system assemblies WF and WR. The following description is specifically directed to the provisional assembling of the front and rear drive system assemblies WF and WR to a vehicle body B in which a stabilizer 101 and several pipes 102 have been previously installed therein and will interfere against the front drive system assembly WF if they are installed in any conventional manner.

Before provisionally assembling the front and rear drive system assemblies WF and WR to the vehicle body B, the front and rear drive system assemblies WF and WR are placed on the carrier pallet P at the provisional assembling station K2 and the vehicle body B is transferred overhead the carrier pallet P at the provisional assembling station K2 by the overhead carrier 41. Taken in order, the steps at the provisional assembling station K2 are: positioning and securing the carrier pallet P through the engagement of the lock pins 4 with the positioning holes 3 formed in the carrier pallet P; actuating the air cylinder 19 to force the clamping fingers 15 to close and to clamp the lug 16 of the base member 8 of the front support HF; actuating the air cylinder 22 to push up the releasing lever 21 linked to the lock pin 12 against the spring so as to disengage the lock pin 12 from the front base member 8, thereby releasing the front base member 8 of the front support HF; and actuating the air cylinders 49 and 52 to cause the holding structures M to hold the suspension damper units U of the front and rear drive system assemblies WF and WR in their appropriate setting posture.

In holding the suspension damper units U, each holding structure M is operated in such a way that the fixed finger 43a is moved to a preselected protruded position while maintaining the swingable fingers 43c of the supporting hand 44 opened, and then the the swingable fingers 43 are closed to force the suspension damper unit U against the V-shaped recess 43b, thereby holding the same.

Figure 12A:
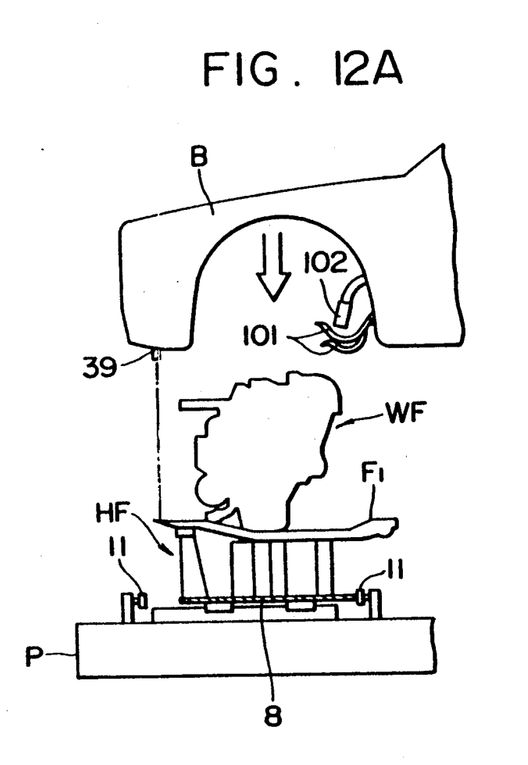
FIGS. 12A to 12C are explanatory illustrations of the provisional assembling of front and rear drive system assemblies to a vehicle body.
Figure 12B:
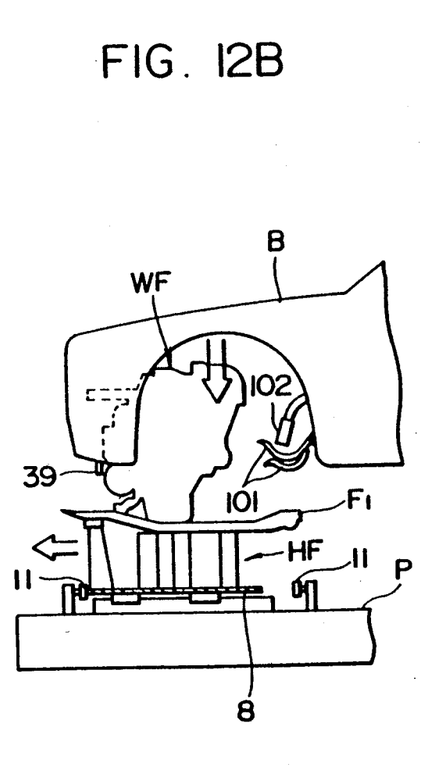
Figure 12C:
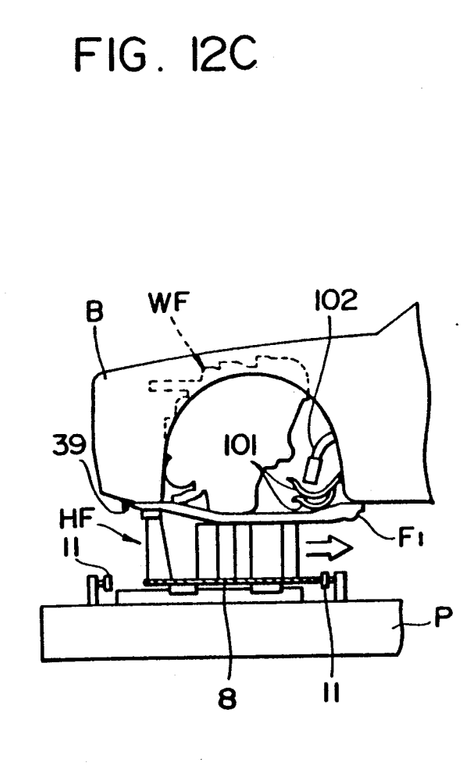

Thereafter, the hanger frame 41a of the overhead carrier 41 of the body carrier conveyor G moves down to lower the vehicle body B. During the lifting down of the vehicle body B, the motor 17 is actuated first to shift forward the slidable table 14 so as to shift forward the front drive system assembly WF and then to shift backward the same. In synchronism with the back and forth movement of the slidable table 14, the air cylinder 56 is actuated to force the front side holding structures M to move back and forth. In such a way as described above, the front and rear drive system assemblies WF and WR are provisionally assembled to the vehicle body B on the carrier pallet P. This is shown in FIGS. 12A-12C At the completion of the provisional assembling of the front and rear drive system assemblies WF and WR to the vehicle body B, the front and rear hanger arms 42 of the hanger frame 41a are turned in the horizontal plane and removed out of the underside of the vehicle body B and the overhead carrier 41 of the body carrier conveyor G returns. Substantially at the same time, the air cylinder 22 is reversed to allow the releasing lever 21 linked to the lock pin 12 to turn back by the spring so as to bring the lock pin 12 into engagement with the front base member 8, thereby securing the front base member 8, and hence, the front support HF in a fixed position. Thereafter, the air cylinders 49 and 52 are reversed to cause the holding structures M to release the suspension damper units U of the front and rear drive system assemblies WF and WR. When all these operations are performed, the carriage A carries the carrier pallet P to the fastening station K3.

Although the above described embodiment of the present invention has been directed to the apparatus having four holding structures M, two in front and in rear, applied to provisionally assembling the front and rear drive system assemblies, each having a strut type suspension system, to a vehicle body in the automobile assembling line, the apparatus of the present invention is independent of the types of suspension systems, and does not always need four holding structures but at least two for right and left either in front or in rear in such case that either one of the front and rear drive system assemblies is provided with a suspension system having damper units which has no need of being held in a setting posture.

The setup of the holding structures M can take various forms. For example, it is permissible to provide a holding hand, similar to the holding hand 44, comprising a pair of finger members with a V-shaped recess movable away from and toward each other for each damper unit of a suspension unit.

The present invention can be available for setting or installing various automobile parts or sub-assemblies such as tanks, pipe assemblies or the like placed on a carrier pallet into a vehicle body or applicable to any type of automobiles such as rear engine, front engine and midship engine cars.

Since certain changes may be made in the described apparatus without departing from the scope of the present invention herein involved, it is intended that all matter contained in the description thereof and as shown in the accompanying drawings shall be interpreted as illustrative and not in a limiting sense.

What is claimed is:

1. An apparatus for provisionally assembling at least one of a front drive system assembly and a rear drive system assembly to a vehicle body in proper registry prior to rigidly securing, said front drive system assembly, said rear drive system assembly and said vehicle body into one unit with fasteners in an automatic automobile assembling line, and for rigidly securing said front drive system assembly, said rear drive system assembly and said vehicle body into one unit with fasteners in said automatic automobile assembly line, comprising:

a carrier pallet for carrying a set of front and rear drive system assemblies, placed in position on the carrier pallet;

a conveyor system for conveying, in a first direction, said carrier pallet with said front and rear drive system assemblies placed thereon to a provisional assembling station where said front and rear drive system assemblies are to be provisionally assembled to a vehicle body;

means for securing said carrier pallet in position in said provisional assembling station after said carrier pallet with said front and rear drive system assemblies thereon has been conveyed to said provisional assembling station;

a base member, supported on said carrier pallet, for carrying said front drive system assembly;

means for selectively locking said base member to and unlocking said base member from said carrier pallet;

slidable means for moving said base member in said first direction and in a direction opposite to said first direction relative to said carrier pallet, after said base member has been unlocked from said carrier pallet;

means for selectively clamping said base member to said slidable means once said carrier pallet has been secured in position in said provisional assembling station so that said slidable means can move said base member in said first direction;

a plurality of holding means installed at said provisional assembling station, each of said holding means for releasably clamping a damper unit which is to be attached to at least said front drive system assembly;

means for sliding each of said holding means, in a second direction, toward said front drive system assembly before each holding means has clamped a damper unit and away from said front drive system assembly after each holding means has released said damper unit;

a vehicle body carrier for conveying said vehicle body above said provisional assembling station and lowering said vehicle body to said provisional assembling station for provisional assembly of said front drive system assembly to said vehicle body; and position adjusting means for shifting said holding means in said first direction forth and in a direction opposite to said first direction in synchronism with movement of said base in said first direction and said direction opposite to said first direction as said vehicle body carrier lowers said vehicle body to said provisional assembling station to properly position said holding means and each said damper unit relative to said vehicle body for provisional assembly.

2. The apparatus as defined in claim 1, wherein said position adjusting means includes a drive means for causing a back and forth movement of each of said holding means in a direction parallel to a lengthwise direction of said vehicle body.

3. The apparatus as defined in claim 2, wherein said means for selectively locking said base member locks said base member to said carrier pallet to position it relative to said carrier pallet prior to provisionally assembling said front drive system assembly to the vehicle body.

4. The apparatus as defined in claim 3, and further comprising stoppers for restricting back and forth movement of said holding means within certain limits.

5. The apparatus as defined in claim 1, wherein each of said holding means comprises a supporting head having a V-shaped fixed finger member and a pair of swingable fingers which open and close to press, and thereby hold, said damper unit against said V-shaped fixed finger member.

6. The apparatus as defined in claim 1, and further comprising fastening means disposed downstream of said provisional assembling station in said automobile assembling line for rigidly securing, and thereby completely assembling, said front drive system assembly and said vehicle body into one unit, with fasteners.

7. The apparatus as defined in claim 6, wherein said fastening means consists of an industrial robot hand provided at a working station after said provisional assembling station.

8. The apparatus as defined in claim 7, wherein an industrial robot hand is provided for both front and rear drive system assemblies.

9. The apparatus as defined in claim 6, wherein said carrier pallet is provided with a plurality of holders adapted to cooperate with said fastening means so as to allow said fastening means to rigidly secure said front drive system assembly and said vehicle body into one unit with fasteners.

10. The apparatus as defined in claim 6, wherein said fastening means consists of an industrial robot hand.

11. The apparatus as defined in claim 1, wherein said front drive system assembly includes an engine.

12. The apparatus as defined in claim 1, wherein said rear drive system assembly includes an engine.

13. The apparatus as defined in claim 12, wherein said vehicle body carrier is an overhead conveyor.

* * * * *